REFLEX THERMOMAGNETIC RECORDING MEMBERS

Filed Nov. 13, 1967 2 Sheets-Sheet 1

INVENTOR
GEORGE RAYMOND NACCI

BY D R Boyd
ATTORNEY

July 28, 1970 G. R. NACCI 3,522,090

REFLEX THERMOMAGNETIC RECORDING MEMBERS

Filed Nov. 13, 1967 2 Sheets-Sheet 2

INVENTOR
GEORGE RAYMOND NACCI

BY D R Boyd

ATTORNEY 3,522,090
REFLEX THERMOMAGNETIC
RECORDING MEMBERS

George Raymond Nacci, Wilmington, Del., assignor to E. I. du Pont de Nemours and Company, Wilmington, Del., a corporation of Delaware Continuation-in-part of application Ser. No. 636,955, May 8, 1967. This application Nov. 13, 1967, Ser. No. 682,232
Int. Cl. H01f *10/00;* B44d *1/16*
U.S. Cl. 117—239 8 Claims

ABSTRACT OF THE DISCLOSURE

Recording members for thermomagnetic copying, consisting of a pattern of magnetic elements fastened to a transparent substrate can be improved in latitude of exposure by a reflective coating on the magnetic elements to partially shield them from direct radiation from the exposing source.

RELATED APPLICATIONS

This application is a continuation-in-part of copending application S.N. 636,955 filed May 8, 1967 and of copending application S.N. 636,728 filed May 8, 1967 each of which are a continuation-in-part of S.N. 410,007 filed Nov. 9, 1964.

FIELD OF THE INVENTION

This invention relates to improved recording members for reflex thermomagnetic recording.

In copending applications S.N. 636,728 filed May 8, 1967 and S.N. 410,007 filed Nov. 9, 1964 there is described and claimed a process for the reflex thermomagnetic recording of data contained on a document.

The process of thermomagnetic recording requires a recording member having magnetic elements of a permanently magnetizable material distributed over the surface of a transparent recording member, the member being partially transparent to the recording radiation, which for the purpose of this discussion will be limited to visible light. The pre-magnetized recording member is placed over the document to be copied and the assembly is exposed to a pulse of light through the back of the recording member. On passing through the member the pulse thermally biases the magnetic elements to a temperature below, but in the vicinity of the Curie temperature. Selective reflection of the light from the document then raises the temperature of elements adjacent to the more reflective portions of the document to a temperature above the Curie temperature so that these elements are demagnetized, thus forming a magnetic image of the document on the recording member. The image can be read out by use of a toner containing a magnetic pigment, by electromagnetic recording heads or by other means.

Many variants of the above method are possible. For example, the recording member can be unmagnetized and the document/recording member assembly can be exposed to the light in the presence of a magnetic field, the exposure being such that the coercivity of the magnetic members is only exceeded by the magnetic field in those regions of the recording member adjacent to the more reflective parts of the document so that a magnetic image is formed corresponding to the reflective parts of the document.

In another modification, a premagnetized recording member is exposed as described above in a field of opposite polarity. In yet another modification an A.C. erasing field can be employed in conjunction with a premagnetized recording member.

It will further be apparent that the radiation can be radiation other than visible light, provided that it is suitably selectively reflected by the document, transmitted by the recording member and capable of heating the magnetic elements of the recording member.

In all of the embodiments of this invention, a semi-transparent recording member is required having a stratum of magnetic material therein which is capable of forming a magnetic image. Transparency is necessary, since the radiation reflected from the documents to form the image initially passes through the recording member. The amount of radiation passing through the recording member is also determined, in part, by the heating of the magnetic elements, by radiation, which must be insufficient to cause the magnetic transition employed for imaging under the magnetis field conditions. At the same time a sufficient amount of magnetic material must be present to provide a magnetized image of sufficient intensity to provide adequate readout.

In S.N. 636,955 filed May 8, 1967, there is described magnetic recording members in which the magnetic material is embedded in the surface of a transparent substrate in the form of a substantially regular pattern, generally lines or dots, spaced sufficiently close to provide adequate resolution for the magnetized image.

The present invention is directed to improvements in thermomagnetic recording members, which are thereby adapted to increase the proportion of light transmitted without excessive biasing of the magnetic elements, thus providing greater latitude in the use of these members.

SUMMARY OF THE INVENTION

The present invention can be defined as an improvment in thermomagnetic recording members which comprises a coating of a reflective material on the surface of the magnetic material of the recording member, which surface is adjacent to the exposing radiation means, the thermomagnetic recording member comprising a substrate film transparent to the exposing radiation from the exposing radiation means and containing a stratum composed of a plurality of discrete areas having a magnetic material capable of magnetization to a hard magnetic state bound thereto, the areas being arranged in a substantially regular pattern, the member having a transmission to exposing radiation of from 10% to 90%.

DETAILED DESCRIPTION OF THE INVENTION

As indicated above, the exposing radiation is generally electromagnetic radiation, in or in the vicinity of the visible region of the electromagnetic spectrum when the document to be copied is a document ordinarily read by eye such as printing, handwriting, books, photographs, line drawings, half-tone pictures and the like. However, the document to be copied need not be so restricted, and can comprise any material which selectively reflects radiation capable of heating the selected magnetic elements. This radiation can include other regions of the electromagnetic spectrum, and particulate radiation such as electron beams. Accordingly, a wide variety of materials and methods of construction can be employed for the recording members. The substrate supports can, for example, be glass, polymeric materials, mica and the like.

In the following, the embodiments of this invention are particularly adapted to copying with electromagnetic radiation in or in the vicinity of the visible region of the spectrum, but it is to be understood that members suitable for use in other regions of the electromagnetic spectrum and with particulate radiation can be constructed by a suitable choice of materials which will be obvious to one skilled in the art.

The necessary criteria for the substrate of the supporting member are that it is substantially transparent to the exposing radiation and has sufficient chemical and thermal stability for the intended use. The material of the substrate is also desirably of low heat conductivity. Flexible supporting members are preferred for some applications.

Polymeric materials are particularly suitable since they can be readily fabricated, as described hereinafter by a variety of techniques.

The supporting members made of polymeric materials can be molecularly oriented or laminated. Thermoplastics or thermosetting materials can be used. Examples include polyethyleneterephthalate particularly biaxially oriented sheets which are sold under the trade name "Mylar," polycarbonate resins such as those sold under the trade name "Lexan," polyvinyl chloride, polystyrene, polymethyl methacrylate, epoxy resins and the like.

A preferred supporting member is made by coating polyethylene terephthalate film with a polyether urethane finish commercially available under the trade name "Imron" RC 811 (consisting of a 70% by weight solids solution in toluene/xylene/Cellosolve acetate of polypropylene glycol [M.W. 1025], trimethylolpropane and toluene diisocyanates having excess isocyanate to which tertiary amine catalyst is added prior to use). The coating is cured at room temperature with a final coating thickness of about 3 mils.

The supporting members contain a pattern of magnetic material magnetizable to a hard magnetic state in a stratum, generally at or in the surface of the supporting member. Preferably the areas containing the magnetic material are indentations in the surface of the supporting member. The pattern is generally a pattern of dots or of lines which are usually spaced at from 1/100 to 1/1500 inch apart. However, any substantially regular pattern can be employed. The indentations can be formed by a variety of techniques such as embossing (with or without the aid of heat and solvents for the substrate to soften the surface thereof) incising, photoengraving, solvent casting of polymer solution on a master plate and the like.

The thickness of the supporting member is not critical but may be determined in part by the intended use and by the thickness of the stratum of the magnetic material. The thickness of the stratum of magnetic material can be from 0.01 to 5.0 mils thick and most preferably from 0.1 to 1.0 mils thick. The minimum thickness of the substrate is determined by the thickness of the magnetic stratum together with a suitable thickness of a continuous layer of substrate to maintain the assembly. If the magnetic members are in a stratum at the surface of the substrate in substantial contact with the document to be copied, which is the preferred configuration, the substrate can be of any desired thickness, e.g., up to ½" or more. As will be described hereinafter, the magnetic material can be in a stratum on the surface of the member away from the document. In this case the substrate is preferably from about 1 to about 10 mils in thickness. With flexible substrates the thicknesses are generally 0.1 to 25 mils. The most usual thicknesses are from 0.2 to 20 mils and preferably 0.5 to 15 mils.

The material capable of magnetization to a hard magnetic state which is attached to the substrate is preferably in the form of a fine powder having a particle size of about one micron and under. The particles should be in the range of 0.01 to 5 microns and preferably from 0.1 to 2 microns.

The magnetizable material must be capable of magnetization such that it exhibits energy product $(BH)_{max}$ of 0.08–8.0 gauss oersteds$\times 10^6$, a remanence $B_r$ of 500–21,500 gauss, a coercivity $H_c$ of 40–6000 oersteds, and a Curie-point temperature of less than 1200° C., preferably from 25° to 500° C. Desirably the magnetizable material should also have as high a saturation magnetization, i.e., $B_s$, as is possible, consonant with the above ranges of properties.

Representative of such materials include the ferrites, the Alnicos®, the Cunifes®, etc., e.g., $Mn_{1.5}FeTi_{0.5}O_4$, $MnFe_2O_4$, $Fe_3O_4$, $CoFe_2O_4$, $NiFe_2O_4$, $CuFe_2O_4$, and $Li_{0.5}Fe_{2.5}O_4$, the various Alnicos® 1–8, Cunico®, chrome steel, cobalt steel, Fe, Co, Ni and the Lodexes® 31, 32, 41, 42, and 55, as well as $Fe_3Al$, $FeBe_2$, $FeBe_5$, $Fe_2B$, $Fe_3C$, $Fe_2Ce$, $Fe_4N$, $Fe_3P$, FeS, $\gamma Fe_2O_3$, $Fe_2P$, $Fe_3Si_2$, $Co_2B$, $CoS_2$, CoZn, $Co_4Zr$, $Ni_2Mg$, $Ni_3Mn$, MnAs, MnB, MnBi, $Mn_4N$, MnP, MnSb, $Mn_2Sb$, $Mn_2Sn$, $Cr_5S_6$, CrTe, $Fe_3O_3S$, $AlFe_2O_4$, $CoFe_2O_4$, $MgFe_2O_4$, $MnFe_2O_4$, $NiFe_2O_4$, $La_2O_3.Fe_2O_3$, $Fe_5C_2$ or $Fe_{20}C_9$ ($\chi$ iron carbide), $Co_2P$, $Mn_3As_2$, $Mn_5P_2$, $Co_xFe_{2-x}O_3$ (Co substituted $\gamma Fe_2O_3$), $(Fe,Co)_2P$, $YCo_5$, $Mn_{1.2}Al$, $Fe_{1.72}Ge$, $BaO.6Fe_2O_3$, PtCo, Co modified $Fe_3O_4$ and the like.

A number of factors contribute to the designation of a material as "hard" or "soft" magnetically. Many magnetic materials usually designated as "soft" will show high coercive force when prepared as fine particles. Geometrical factors, including size and shape of the particle, are important. For example, iron is normally considered a "soft" magnetic material with a coercivity of a fraction of an oersted. However, small iron particles composed of single domains with lengths great compared to their diameters can be expected to show coercivities of the order of $10^3$–$10^4$ oe. In this case, high coercivity is due to shape anisotropy. For other materials, such as manganese bismuthide or cobalt, high coercivity for single domain particles may be the result of magnetocrystalline anisotropy arising from an easy direction of magnetization along a particular crystalline direction. Even fine nickel particles should show a high coercivity under uniaxial stress. Many normally "soft" magnetic materials not in single domain form can be made to exhibit a high coercivity after being subjected to cold work or other similar treatments designed to introduce defects or internal strains which serve to pin or block movement of domain walls. Further discussion of "Hard Magnetic Materials" can be found in the article by that title by E. P. Wohlforth, Advances in Physics, supplement to Philosophical Magazine 8 (April 1959), pp. 87–224, and in the book by R. M. Bozorth on "Ferromagnetism," D. Van Nostrand and Company, Princeton, N.J. (1951), particularly the section on fine particles, pp. 828–834. "Soft Magnetic Materials" are also discussed widely in the literature, e.g., E. W. Lee and R. L. Lynch, Advances in Physics, supplement to Philosophical Magazine 8 (July 1959), pp. 292–348.

A particularly outstanding species of the magnetic material which can be used in formulating the compositions of present invention is chromium dioxide ($CrO_2$). This material can be used alone, i.e., in substantially pure form, or modified with one or more reactive elements. Suitable descriptions of both the process of preparation and the compositions which have the necessary properties can be found in the following illustrative list of issued U.S. patents:

Arthur, U.S. 2,956,955
Arthur & Ingraham, U.S. 3,117,093
Cox, U.S. 3,074,778
Cox, U.S. 3,078,147
Cox, U.S. 3,278,263
Ingraham & Swoboda, U.S. 2,923,683
Ingraham & Swoboda, U.S. 2,923,684
Ingraham & Swoboda, U.S. 3,034,988
Ingraham & Swoboda, U.S. 3,068,176
Swoboda, U.S. 2,923,685

The particulate magnetic material is mixed with a suitable polymeric binder to adhere the particles to each other and to the substrate. The binder should preferably be flexible, thermally stable, and have low heat conductivity. Of course, in the case of magnetic materials with relatively high Curie temperatures, care must be used naturally in selecting the binder, i.e., the matrix in which they are to be dispersed, and also the substrate on which the magnetizable stratum is to be carried. However, such selection is believed to be well within the skill of the art.

The binder is preferably used as a solution or dispersion of the binder solids of the "high solids" type so that when applied to the indented areas of the substrate, it does not dry down to leave only partially filled grooves or holes that require multiple refilling steps to give a recording member with a smooth finish.

Materials for binders include the various commercially available acrylate and methacrylate, as well as functionally substituted acrylate and methacrylate, polymers; the various vinyl and vinylidene polymers and copolymers, such as the vinyl chloride/vinyl acetate, vinylidene chloride/vinyl acetate, and vinyl chloride/vinyl fluoride polymers; the various olefin polymers and copolymers, such as polyethylene and polypropylene; ethylene/vinyl acetate copolymers, ethylene/vinyl chloride copolymers, and the like.

Other binder or matrix materials, including natural, modified natural, and synthetic materials, can also equally well be used, provided they exhibit the fundamentally necessary physical properties of being unaffected by magnetic force fields, not thermally sensitive, and compatible with the magnetic material involved. Suitable more specific matrix materials, in addition to the just previously enumerated specific examples of addition polymers, include such natural matrix materials as tung or China wood and linseed oils, the well-known commercially available epoxy resin formulations, air-settable polyol acreolein acetals and ester formulations thereof, etc., any of the many well-known printing ink and lithographic type varnishes, the natural resins such as Copal, shellac, Damar gum, and the like; the drying oils, any of the many well-known alkyd-based varnish and drying oil-type formulations; the derived natural polymers such as regenerated cellulose, i.e., rayon; cellulose acetate, cellulose acetate/propionate, cellulose propionate, cellulose acetate/butyrate and the like; the synthetic condensation polymers such as the well-known nylons, e.g., polycaprolactam, polyhexamethylene-adipamide, polyurethanes, e.g., that from ethylene glycol/adipic acid/tolylene diisocyanate, as well as the polyurethanes based on relatively high molecular weight addition glycols such as that from a polytetramethylene ether glycol obtained by ring opening of tetrahydrofuran with adipic acid and toluene or hexamethylene diisocyanate with, if desired, a finished diamine, such as hexamethylenediamine, and the like; or like mixed ester/amides and synthetic condensation polymers derived therefrom such as polyhydroxymethyl polyhexamethylene-adipamide, and the like; thermosetting resin binders or matrices such as, for instance, the polyureaformaldehyde and modified polyureaformaldehyde compositions wherein the modifying component can be, for instance, an amine such as hexamethylene-diamine and the like.

In addition to the foregoing largely wholly organic binders and matrices, suitable inorganic binders and matrices can be used, the only requirement being that they be transparent to the exposing radiation. Suitable examples include the silicones, the Ludox® silicas, aluminum oxide film-formers, titanate film-formers which can be dispersed or substantially vapor deposited and heat set, and the like.

The primary requisites for these low heat conductivity binder matrices when used are that:

(1) They be nonreactive with the magnetic filler, i.e., the working component, (2) They be thermally stable to reasonable levels, e.g., 200–400° C., for short (milliseconds) periods, and stable to the exposing radiation, and (3) They be preferably flexible and in any event readily processable by conventional techniques such as solution, milling, calendering, extruding, and the like.

The binder material is generally employed with the hard magnetic material in an amount from about 70% to about 5% by weight of the dry solids together with a sufficent amount of liquid solvent or diluent to provide a workable composition which can be doctored into the indentations of the preformed substrate.

Alternatively the magnetic stratum can be formed by printing a raised pattern of the magnetizable material mixed with binder on a smooth substrate film. The recesses between the pattern elements can then be filled with a polymeric material to form a recording member having a smooth surface.

The present invention requires that the surface of the magnetic elements adjacent to the exposing radiation source be coated with a reflective layer.

The reflective layer can be a metallic reflector such as silver, copper, gold, aluminum, chromium, nickel, iron, iridium, platinum, indium, antimony, bismuth, or the like. It is also within the scope of the present discovery to employ a diffuse reflective pigment such as a layer of titanium dioxide or magnesium oxide as the reflective layer.

Reflective metallic coatings can be formed by a variety of techniques such as wet reduction in the case of metals such as silver and copper, vacuum evaporation, electrolytic deposition and the like. In order to protect films sensitive to oxidation, the metallic films can be coated with a thin layer of polymeric material. Coatings of pigments such as $TiO_2$ to form reflective coatings can be applied as paints.

Where the magnetic material is contained in indentations over the surface of the member substantially in contact with the document to be copied, the reflective layer must form a lining to the indentations. To form such a lining the indented surface of the substrate film is coated with the selected reflective coating prior to filling the indentations with magnetic material. The undesired portions of the coating between the indentations can then be removed by abrasion. The magnetic material and binder can be inserted in the lined indentations before or after the abrasive cleaning process.

In another embodiment the magnetic material is inserted in the indentations then the whole surface is plated. The reflective coating between the magnetic elements can again be removed by abrasion, leaving a reflection coating on the surface of the magnetic elements.

This invention will be better understood by reference to the accompanying drawings which are to be considered a part of the specification.

Referring now to the drawings.

Figure 1:
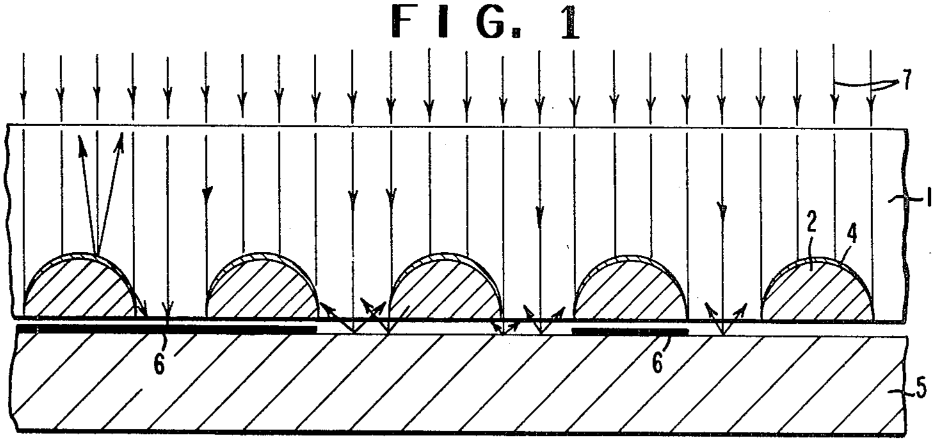
FIG. 1 shows a cross section of a recording member of the present invention in substantial contact with a document.
Figure 2:
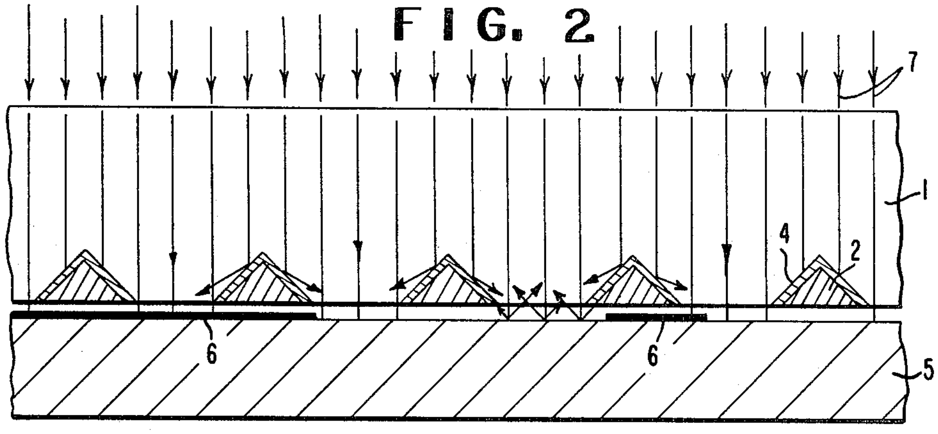
FIG. 2 shows a cross section of another recording member of the present invention in substantial contact with a document, and having indentations containing magnetic material which are of a triangular cross section.
Figure 3:
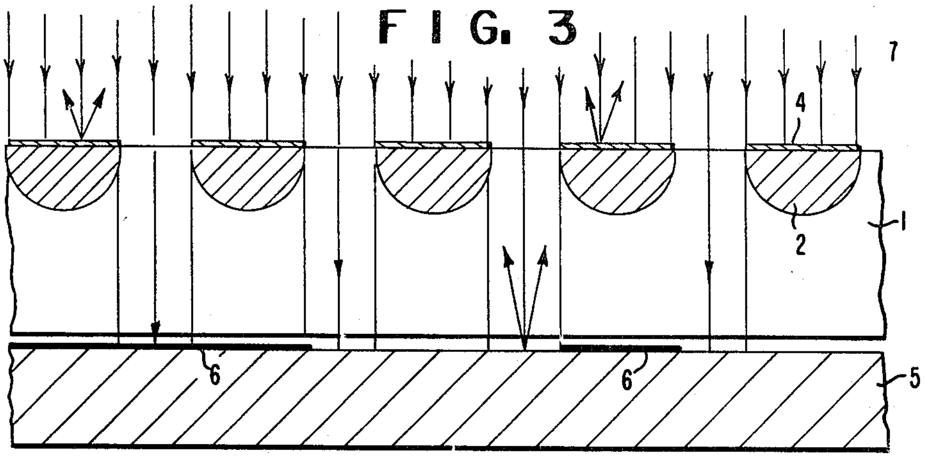
FIG. 3 shows a cross section of yet another recording member of the present invention adjacent to a document, but dispersed so that the magnetic elements are on the surface opposite that of the document.

Referring now to the drawings, in FIGS. 1, 2 and 3 a substrate or support member 1 contains indentations which are filled with a magnetizable material 2. In FIGS. 1 and 2 the surface of the indentations is lined with a reflective coating 4 so that the surface of the magnetic material away from the document 5 is substantially shielded from direct radiation from the exposing source (not shown). In FIG. 3 the surface of the magnetic elements 2 away from the document 5 is coated with a reflective layer 4 so that again the magnetic elements 2 are substantially screened from the direct radiation from the source.

In a typical office copying process the magnetic elements 2 are premagnetized by drawing the recording member over a bar magnet, and the document, which contains a "message" in the form of less reflective regions 6 is placed in substantial contact with the recording member as indicated in FIGS. 1, 2 and 3. The assembly is then exposed to a pulse of radiation, which can be visible light. The magnetic elements are heated to a temperature somewhat below the Curie point of the magnetic material by the direct radiation, indicated in the FIGS. 1, 2 and 3 by lines 7, the direction of the light being indicated by arrows in the figures. In the areas of the document which are most reflective (i.e. white) the light is reflected back and heats the magnetic elements adjacent thereto to a temperature above the Curie temperature, demagnetizing the same. Areas which are less reflective do not demagnetize or only partially demagnetize the magnetic elements so that a magnetic image of the document is formed which can be read by treatment of the recording member with a toner or ink consisting of a magnetic pigment, and if desired, can be transferred to paper to form a copy of the original.

In the configuration shown in FIGS. 1 and 2 the magnetic image is reversed on the magnetic recording member, so that on transfer to paper a right reading copy of the document is obtained. In the configuration shown in FIG. 3 the magnetic image formed on the recording member is right reading when read from the side bearing the magentic stratum.

It will be seen that the principal effect of the reflective coating in the recording member of the present invention is to increase the proportion of energy (light) absorbed by the magnetic elements by reflection from the document relative to that absorbed directly from the energy (light) source.

The process of thermomagnetic recording is more fully explained in my copending application Ser. No. 636,728, the disclosure of which is hereby incorporated by reference.

Figure 4:
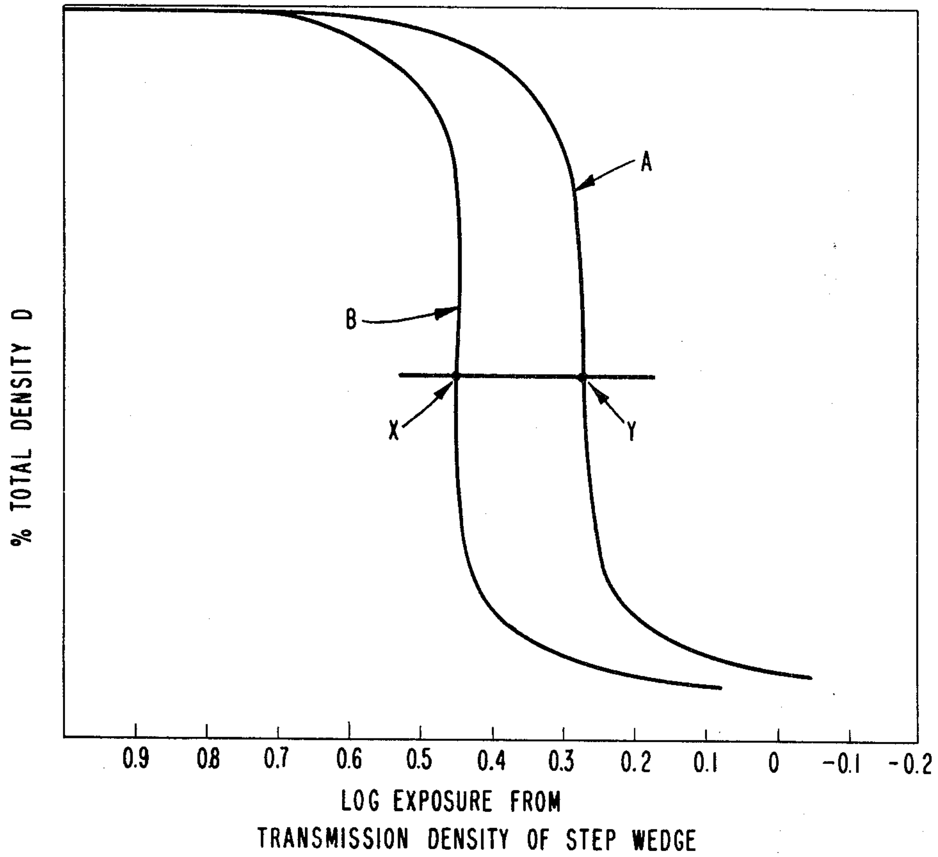
FIG. 4 is a diagram to show how the efficiency of the recording member is measured for an office copying process using visible light.

FIG. 4 is a diagram which shows the method by which the efficiency of a recording member can be determined. The diagram is obtained in the following manner.

The magnetic field is exposed through a step wedge to a flash lamp contained in an integrating sphere over black and over white paper as documents. The recording member is then toned with a magnetic ink such as carbonyl iron slurried in a Freon and the image transferred to waxed paper softened with hexane. The waxed paper is then heated to fix the powder image. Two or three transfers are generally necessary to pick up all of the toner. Transmission densities are measured for each step of the wedge, five measurements being taken and averaged, using a "Densichron" densitometer.

The results are then plotted as the percentage of maximum density of the copies to the log of the exposure calculated from the density of the steps of the wedge. Two curves are obtained, one for black paper having a density of 2.3 measured directly and one for white paper having a density of 0.10, which are referred to as the message curve A, and the background curve B, respectively, as shown in FIG. 4.

It is possible to assign to any original a characteristic figure which describes the change in over-all exposure caused by the two densities (background and message) on the original. This is not the arithmetic difference between the two densities. The background as well as the message always shows finite absorption. What is required is to determine the total intensity in the background and in the message areas, due to both incident and reflected light, then to determine the ratio of these two intensities.

It is a sufficient approximation to exclude all reflections but the principal one at the original surface. This gives:

$$I_m=I_0+\frac{I_o}{10^{D_m}} \text{ and } I_b=I_o+\frac{I_o}{10^{D_b}}$$

where $I_m$ and $I_b$ are the total intensities at a surface which faces the original in the message and background areas, respectively; $I_o$ is the incident intensity and $D_m$ and $D_b$ are reflection densities of the message and background areas of the original, respectively. Upon taking the ratio of the two total intensities, the incident intensity cancels out, so that reflection from the original gives two exposure intensities having a constant ratio, the exposure factor. The logarithm of the ratio gives for a particular original a characteristic figure which is, in effect, a density. It is that density which, if it were present in the message areas of a positive transparency, would give the same ratio of intensities. Thus:

$$\text{Log E.F. (log exposure factor)}=\text{Log}\frac{I_b}{I_m}=\text{Log}\frac{1+10^{-D_b}}{1+10^{-D_m}}$$

For an original with a message density of 2.3 and a background density of 0.1 the log E.F. is 0.25. The ratio of the actual displacement of the message and background curves (i.e., percentage of the distance X to Y in FIG. 4 measured at D=50%) to the ideal displacement (0.25) is a measure of the efficiency of the recording member in the system and can be called the Reflected Light Usage (R.L.U.).

The curve of FIG. 4 for determining R.L.U. of a recording member can also be obtained by recording a uniform A.C. signal on the recording member, exposing the recording member to a light source through a step wedge as described above and measuring the amplitude of the resulting A.C. signal relative to the original using a tape recorder.

The reflective coating of the magnetic elements substantially increases the R.L.U. of a given recording member.

It will be apparent that copying can be accomplished with any light intensity at which the message and background curves are separated, and that maximum contrast is obtained in the copying process when the density separation of the curves is a maximum. The greater the value of R.L.U. the wider the latitude of exposure possible with a given original. Conversely, with a given recording member and exposure, the greater the R.L.U., the wider the variety of documents that can be effectively copied without adjusting the exposure.

This invention is further illustrated by the following examples. These examples are provided by way of illustration and are not intended to fully delineate the scope of this discovery.

Example I

A chromium dioxide-filled line film embossed in 5 mil thick commercially available polycarbonate film (480 lines per inch, 0.376 mil deep, 58% transmission) was sprayed with No. 93 sensitizer (4 oz. per gal. of water, Peacock Laboratory, Philadelphia) and rinsed in tap water. The following solutions were prepared using Peacock Lab materials. Concentrated silver solution A 16 oz. in 4¾ gal. of water; concentrated silver solution B 16 oz. in 4⅞ gal. water; concentrated reducer C 16 oz. in 4⅞ gal water. Solutions A and B were mixed and the mixture fed to one nozzle of a Peacock sliver spray gun Model P, and sprayed one foot away from the film for one minute. Concentrated reducer solution C was simultaneously fed to the second nozzle of this 2-nozzle spray gun. After spraying, the surface of the film was cleaned with a dispersion of 0.3 micron aluminum oxide abrasive in water. This removed silver from the transparent areas of the $CrO_2$-filled polycarbonate film but left an adherent silver deposit over the surface of the $CrO_2$-filled grooves. The film was magnetized in a 1200 oe. D.C. field and then reflex-exposed with silvered side toward the xenon flash lamp to a test pattern on photographic paper having an optical density of 1.44 in the black areas and 0.11 in the white areas using an xenon flashtube mounted in a 7″ diameter integrating sphere. The exposure was at 190 microfarads and 1025 volts. Development of the exposed film with a toner slurry afforded an image of excellent quality.

Example II

An embossed 5-mil thick polycarbonate film having a pattern of 570 lines per inch, 0.37 mil deep, and 0.88 mil wide, was sprayed with Peacock Lab Silver solutions as above. The film was then filled with a dispersion of $CrO_2$ in an alkyl/binder and allowed to dry overnight. The surface of the cured film was cleaned with 0.3 micron aluminum oxide abrasive dispersed in water to give transmission optical density for the filled film of 0.29. This film was magnetized in a 1200 oe. D.C. field and reflex exposed against the test pattern on photographic paper as before at 1100 volts and 190 microfarads. The exposed film was developed with a magnetic toner slurry give an image of excellent quality.

Example III

A replica film made of cellulose acetate and having a dot pattern embossed in the surface at a spacing of 1/500″ was coated with a mixture of 18 ml. of Stoddard solvent and 7 ml. of a commercial titanium dioxide pigmented white oil base paint. The film was allowed to dry until the paint became sticky, then the surface of the film was wiped with a tissue and drying was completed. The optical density, in transmission, of the film before whitening the optical density was 0.12, measured with white light using a Welsh Densichron densitometer.

A chromium dioxide ink was prepared by ink milling 90 gm. of $CrO_2$, 10 gm. of an alkyd resin ("Aroplaz 1271") and 45 cc. of mineral spirits. Five grams of the above ink was mulled with 20 drops of Stoddard solvent and then applied to the whitened indented surface of the replica film using a doctor knife with a rounded edge.

The R.L.U. of the resultant recording member was measured and found to be 84.5%. The R.L.U. of similar recording members filled with chromium dioxide but without whitening was found to be about 50%.

Example IV

A 570 lines per inch nickel plate was used to hot emboss 5 mil polycarbonate film at 175° C. and 800 p.s.i. for 5 minutes. This produced a film with V grooves about 0.3 mil deep.

The grooved surface of the film was coated with gold by vapor deposition. The transmission optical density of the film was 2.3.

A chromium dioxide ink of the following composition was used to fill the above film:

| | Percent |
|---|---|
| $CrO_2$ | 66 |
| Alkyd resin (Example III) | 16.5 |
| Stoddard solvent | 17.5 |

Five strokes were taken with a round edged doctor knife (1/8″ radius) carrying the above composition during a 30 second period. The surface of the film then had most of the $CrO_2$ ink removed by use of a sharp edged doctor knife.

After drying for about 16 hours, the surface of the film was cleaned with 0.3μ alumina abrasive and water. This action removed the gold from the spaces between the filled grooves.

Transmission optical density of the film was 0.25.

The R.L.U. was determined to be 70% for this film as compared to 45% for a film made from the same embossing plate but not having reflective grooves.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A thermomagnetic recording member comprising a substrate film transparent to exposing radiation from an exposing radiation means, and containing a plurality of discrete indented areas having a magnetic material capable of magnetization to a hard magnetic state contained therein, said indented areas being arranged in a substantially regular pattern, and a coating of a reflective material disposed solely on the surface of the magnetic material adjacent to the exposing radiation means in a manner such that said magnetic material is shielded from said exposing radiation while the adjacent uncoated portion of said thermomagnetic recording member transmits between 10% to 90% of said exposing radiation.

2. Article of claim 1 in which the reflective coating is a metallic coating.

3. Article of claim 1 in which the reflective coating is gold.

4. Article of claim 1 in which the reflective coating is a diffuse reflective pigment.

5. Article of claim 4 in which the pigment is $TiO_2$.

6. A recording member for reflex thermomagnetic recording by exposing radiation from an exposing radiation means, said radiation passing through the said member and being selectively reflected from a document, which comprises a substrate having a plurality of indentations in the form of substantially equally spaced grooves at a spacing of from 1/100 to 1/1500 of an inch in the face of said substrate adjacent to the document, said grooves having a coating of a reflective metallic film, said grooves being filled with finely particulate magnetic material capable of being magnetized to a hard magnetic state in a binder; said reflective metallic film being disposed solely on the surface of the magnetic material adjacent to the exposing radiation means in a manner such that said magnetic material is shielded from said exposing radiation while the adjacent uncoated portion of said thermomagnetic recording member transmits between 10% to 90% of said exposing radiation.

7. Article of claim 6 in which the metallic film is gold.

8. Article of claim 7 in which the magnetic material is finely particulate chromium dioxide.

References Cited

UNITED STATES PATENTS

| | | | |
|---|---|---|---|
| 2,552,209 | 5/1951 | Murray | 117—17.5 |
| 2,793,135 | 5/1957 | Sims et al. | 346—74 |
| 3,131,078 | 4/1964 | Fuller et al. | 117—93.2 |
| 3,224,333 | 12/1965 | Kolk et al. | 117—71 |

WILLIAM D. MARTIN, Primary Examiner

B. D. PIANALTO, Assistant Examiner

U.S. Cl. X.R.

117—240